United States Patent
Haberl et al.

(10) Patent No.: US 10,639,977 B2
(45) Date of Patent: May 5, 2020

(54) TOP HAVING A CENTERING PIN FOR A ROOF TIP

(71) Applicant: Webasto SE, Stockdorf (DE)

(72) Inventors: Franz Haberl, Stockdorf (DE); Christian Rudolfi, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 75 days.

(21) Appl. No.: 15/950,314

(22) Filed: Apr. 11, 2018

(65) Prior Publication Data

US 2018/0304729 A1 Oct. 25, 2018

(30) Foreign Application Priority Data

Apr. 19, 2017 (DE) .......................... 10 2017 108 297

(51) Int. Cl.
*B60J 7/12* (2006.01)
*B60J 7/185* (2006.01)
*B60J 7/16* (2006.01)

(52) U.S. Cl.
CPC .............. *B60J 7/1204* (2013.01); *B60J 7/12* (2013.01); *B60J 7/1851* (2013.01); *B60J 7/1853* (2013.01); *B60J 7/1664* (2013.01)

(58) Field of Classification Search
CPC . B60J 7/1204; B60J 7/12; B60J 7/1853; B60J 7/1664
See application file for complete search history.

(56) References Cited

U.S. PATENT DOCUMENTS

| | | | |
|---|---|---|---|
| 2,674,480 A | | 4/1954 | Vigmostad |
| 5,435,615 A | * | 7/1995 | Schmitz .................. B60J 7/1851 292/113 |
| 6,213,534 B1 | | 4/2001 | Mac Farland |
| 6,322,114 B1 | | 11/2001 | Kurachi et al. |
| 2002/0007414 A1 | * | 1/2002 | Inoue ...................... H04W 88/02 709/230 |
| 2003/0146643 A1 | * | 8/2003 | Dietl ........................ B60J 7/1851 296/121 |
| 2004/0032148 A1 | * | 2/2004 | Hasselgruber ........... B60J 7/143 296/121 |
| 2008/0290688 A1 | * | 11/2008 | Brockhoff .............. B60J 7/1851 296/121 |
| 2009/0072591 A1 | * | 3/2009 | Baumgartner ........... B60J 7/185 296/225 |
| 2015/0224861 A1 | * | 8/2015 | Kopp ....................... B60J 7/061 296/216.05 |

* cited by examiner

*Primary Examiner* — Lori L Lyjak
(74) *Attorney, Agent, or Firm* — Fitch, Even, Tabin & Flannery, LLP

(57) ABSTRACT

A convertible top, having a top linkage, and a roof tip which is fixed to a front cowl of the vehicle in the closed position, and a centering arrangement which defines the position of the roof tip in relation to the cowl in the transverse direction of the vehicle and in the vertical direction of the vehicle in the closed position and which comprises a centering pin which engages into a centering recess of a centering seat. An insert can be disposed in the centering recess having a contact side with which a front end of the centering pin is in contact when in the centering position and formed by an elastic element. Alternatively, an elastic element can be disposed on the front end of the centering pin, and in contact with a ground of the centering recess when the centering pin is in the centering position.

11 Claims, 9 Drawing Sheets

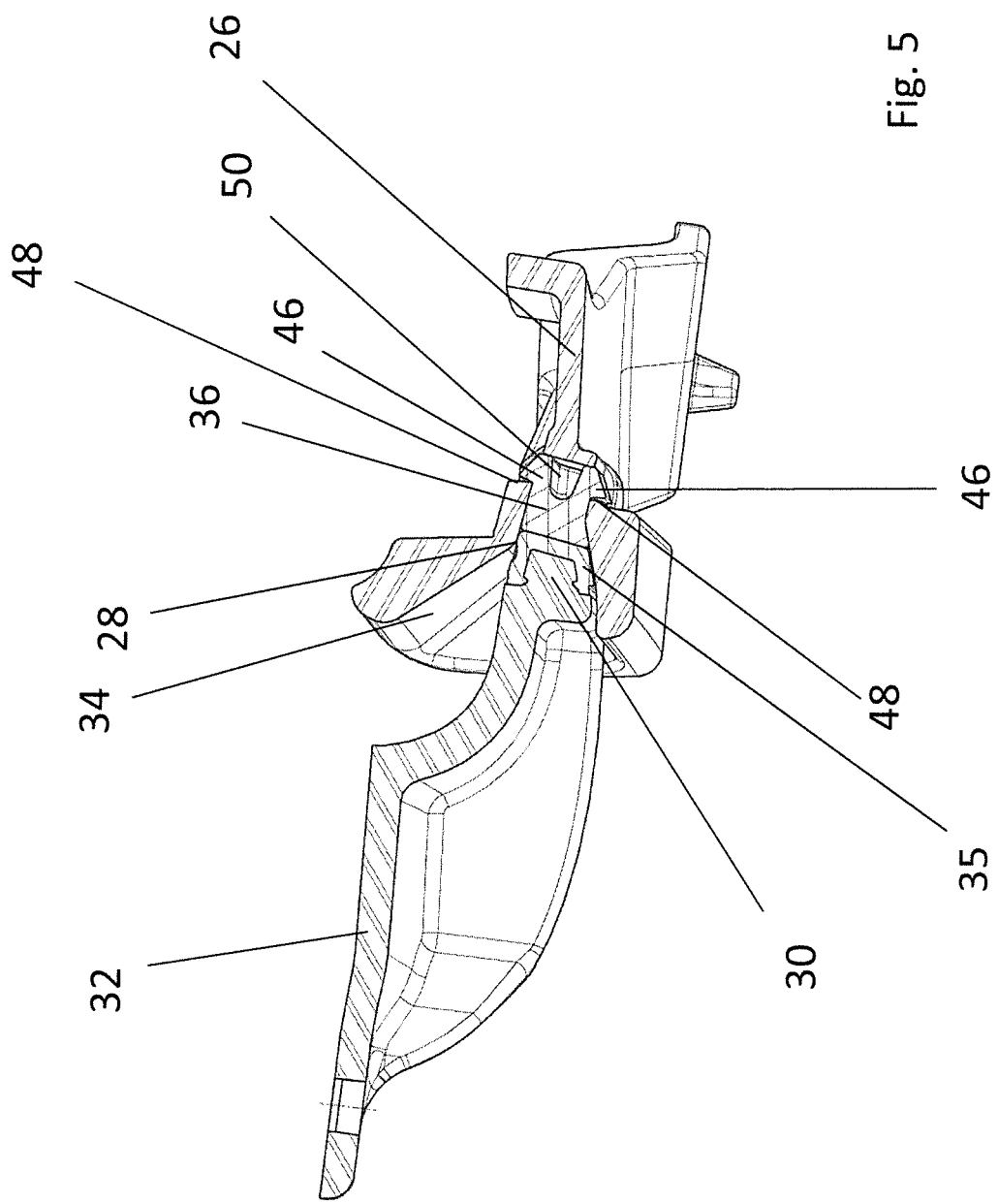

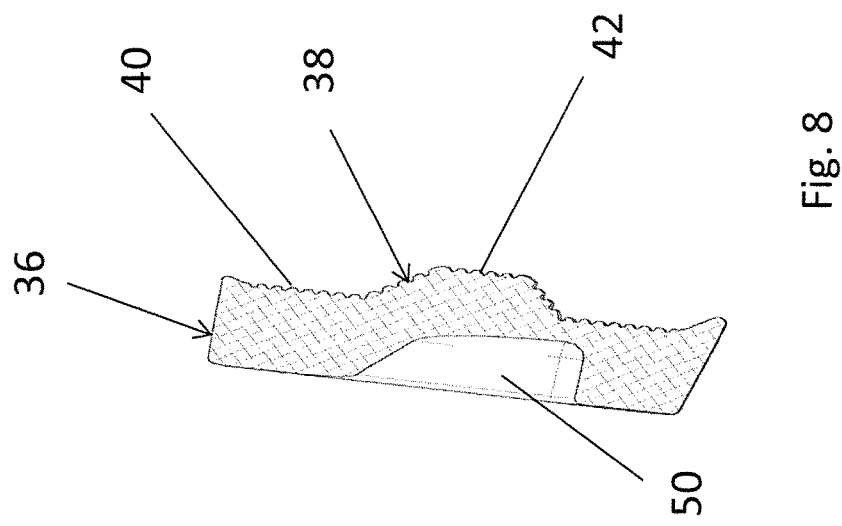
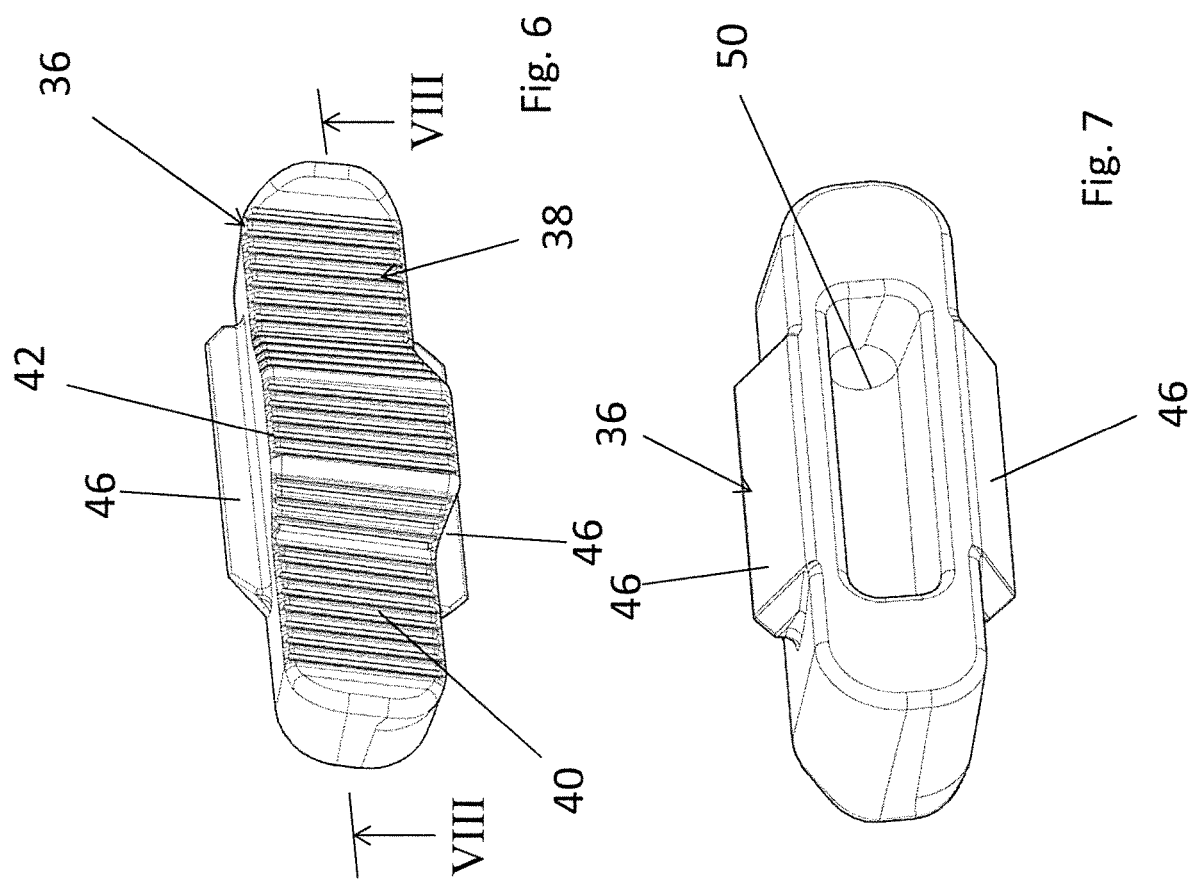

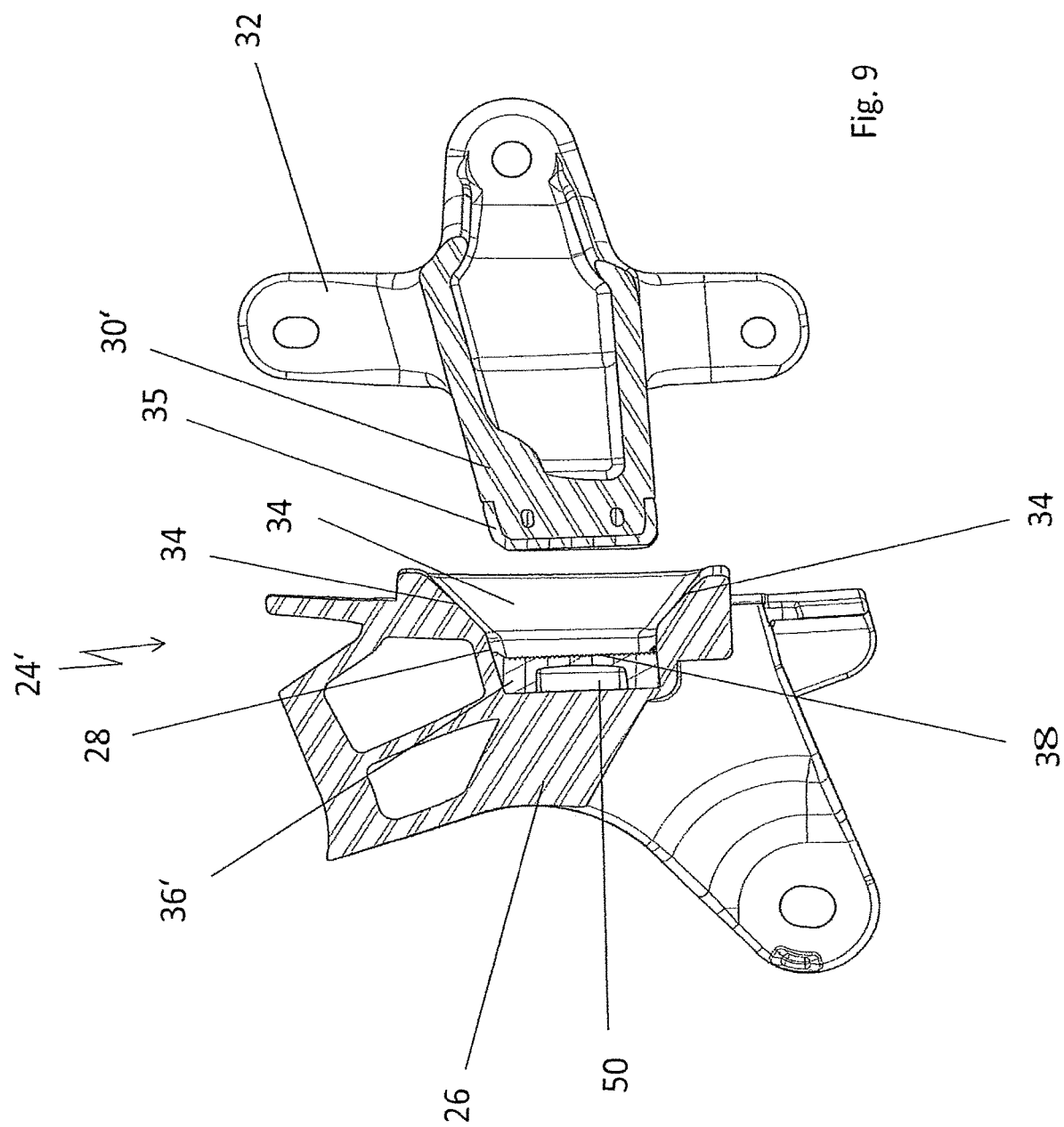

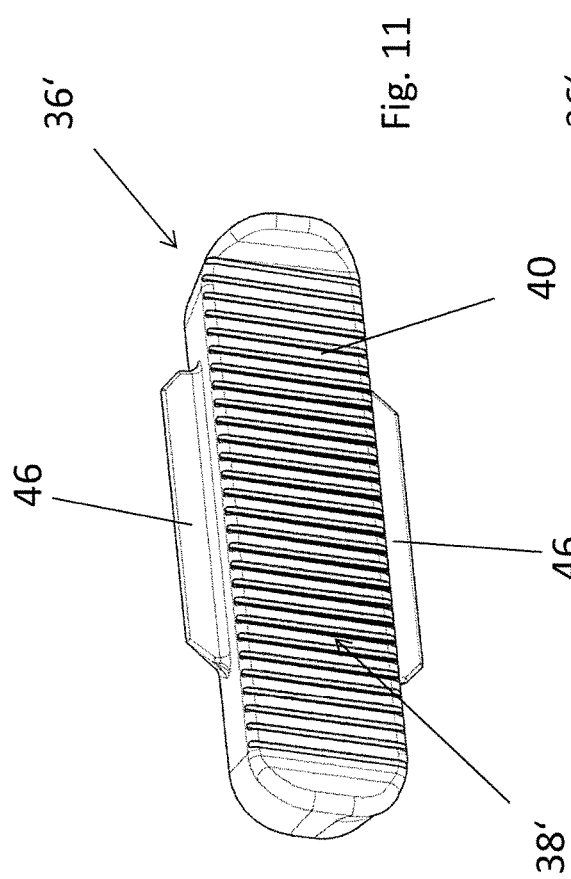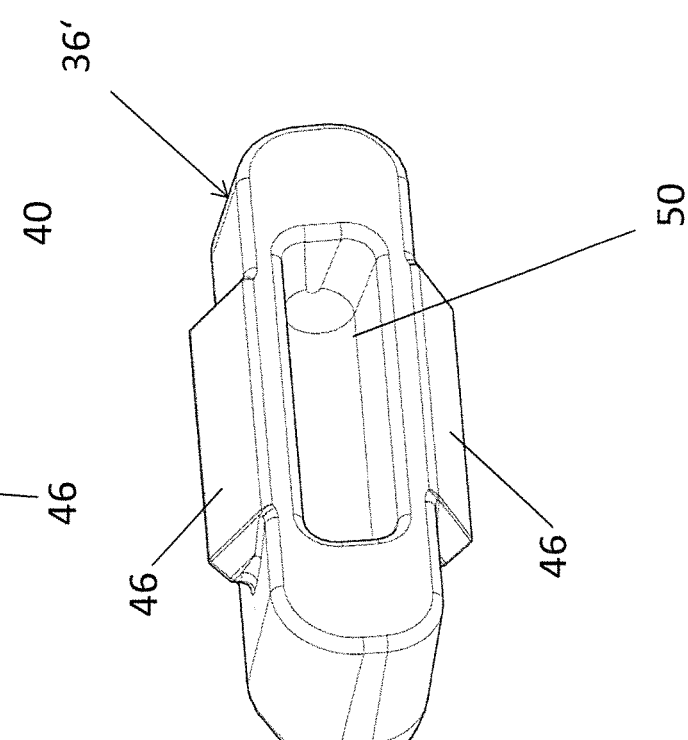

ized above in which the risk of deformation of the roof tip and/or of the front cowl due to the forces exerted by the centering arrangement is minimized.

TOP HAVING A CENTERING PIN FOR A ROOF TIP

CROSS-REFERENCE TO RELATED APPLICATIONS

This application claims priority from German Patent Application Number DE 10 2017 108 297.2, filed Apr. 19, 2017, which is hereby incorporated herein by reference in its entirety for all purposes.

FIELD

The invention relates to a top of a convertible vehicle having the features of a top linkage which can be displaced between a closed position, in which an interior of the vehicle is covered, and a storage position, in which the interior is uncovered and the top is situated in a stored position, and a roof tip which is fixed to a front cowl of the vehicle in the closed position, and a centering arrangement which defines the position of the roof tip in relation to the cowl in the transverse direction of the vehicle and in the vertical direction of the vehicle in the closed position and which comprises a centering pin which engages into a centering recess of a centering seat when in a centering position, wherein an insert can be disposed in the centering recess, the insert having a contact side with which a front end of the centering pin is in contact when in the centering position and which is formed by an elastic element, or wherein the centering pin can have an elastic element at its front end, the elastic element being in contact with a ground of the centering recess when the centering pin is in the centering position.

BACKGROUND

A top of this kind is known from practice and comprises a top linkage by means of which a top cover can be spread or rigid roof shells of a so-called retractable hard top (RHT) can be displaced. For this purpose, the top linkage can be displaced between a closed position, in which a vehicle interior is covered, and a storage position, in which the top is stored in a storage space of the vehicle and the vehicle interior is uncovered. The top comprises a rigid roof element, a so-called roof tip, which is disposed in front in the closed position and which is fixed to a front cowl of the vehicle in the closed position, said cowl being an upper frame part of a frame of a windshield of the vehicle, said frame part extending in the transverse direction of the vehicle. In a folding top having a foldable top cover, the roof tip is a front bow. In an RHT, the roof tip is formed by a rigid roof shell that also forms a portion of the outer skin of the roof. For fixing the roof tip to the front cowl, the top comprises at least one locking arrangement having a locking hook or the like which is pivotably mounted on the roof tip and, in the closed position, engages behind a locking bolt rigidly connected to the front cowl, thus securing the top against unintentional displacement. In order to be able to arrange the top and the roof tip on the front cowl in an exact position in the transverse direction of the vehicle and in the vertical direction of the vehicle, a centering arrangement is provided which comprises a centering pin which is disposed on the roof tip and which engages into a centering recess of a centering seat formed on the front cowl when the top is being displaced into the closed position. In order to stabilize the roof tip on the front cowl, the roof tip is kept under tension on the front cowl. Thus, the front end of the centering pin bears down on the ground of the centering recess, which, in turn, can cause the front cowl and the roof tip to be deformed.

The object of the invention is to provide a top of the kind mentioned above in which the risk of deformation of the roof tip and/or of the front cowl due to the forces exerted by the centering arrangement is minimized.

According to the invention, this object is attained by the top having of a top linkage which can be displaced between a closed position, in which an interior of the vehicle is covered, and a storage position, in which the interior is uncovered and the top is situated in a stored position, and a roof tip which is fixed to a front cowl of the vehicle in the closed position, and a centering arrangement which defines the position of the roof tip in relation to the cowl in the transverse direction of the vehicle and in the vertical direction of the vehicle in the closed position and which comprises a centering pin which engages into a centering recess of a centering seat when in a centering position, wherein an insert can be disposed in the centering recess, the insert having a contact side with which a front end of the centering pin is in contact when in the centering position and which is formed by an elastic element, or wherein the centering pin can have an elastic element at its front end, the elastic element being in contact with a ground of the centering recess when the centering pin is in the centering position.

SUMMARY

Thus, according to the invention, it is proposed for an insert to be disposed in the centering recess, said insert having a contact side with which a front end of the centering pin is in contact when in the centering position and which is formed by an elastic element. Alternatively, an elastic element can be disposed on the front end of the centering pin, said elastic element being in contact with a ground of the centering recess when the centering pin is in the centering position.

Forces exerted on the front cowl by the centering pin in the closed position can be absorbed by the insert in the centering recess. In this way, deformation of the front cowl and of the roof tip is effectively counteracted. Still, it is possible to restrain the roof tip on the front cowl, thereby stabilizing the roof tip in terms of position. The centering pin can thus also sit tightly and firmly in the centering recess.

The top according to the invention can be a folding top, in which a top cover is spanned by means of a top linkage, or a retractable hart top (RHT), which comprises roof shells that can be displaced by means of the top linkage. The folding top can also be a so-called panel-bow top, which comprises panel bows that are disposed adjacent one behind the other in the longitudinal direction of the top when the top is in the closed position and which are covered by the top cover.

In a preferred embodiment of the top according to the invention, the elastic element is made of an elastic plastic material.

In order to ensure that the centering pin moves into the centering seat with as little noise as possible when the top is displaced into its closed position, the contact side of the insert is corrugated in a preferred embodiment of the top according to the invention. The corrugation prevents potential squeaking or other disturbing noises, and it does so in the closed position of the top linkage and of the top, as well. Moreover, the risk of the centering pin sticking to the insert is reduced. Also, the corrugation can increase the deformability of the insert.

Advantageously, the retaining element is securely retained in the centering seat. In a preferred embodiment of the top according to the invention, the insert hast at least one retaining element having a substantially hook-shaped cross-section and retaining the insert in the centering seat.

In a specific embodiment of the top according to the invention, the retaining element is formed by a retaining rib which is disposed in an area of the insert that faces away from the contact side. The retaining rib engages behind a corresponding retaining or latching surface of the centering seat, which may be formed by an undercut or a cutout, for example.

In order to facilitate installation of the insert in the centering seat, the insert can have a cavity at the side facing away from the contact side. The material of the insert can retreat into the cavity in the area of the retaining element when the insert is inserted into the centering seat. When the installation position is reached, the retaining element having the hook-shaped cross-section can spring back and engage behind the retaining or latching surface.

Preferably, the insert of the centering recess is made of a rubber-elastic material such as EPDM.

In a specific embodiment of the top according to the invention, the centering pin comprises a plastic overmold. The plastic overmold is in particular made of a hard plastic and protects vehicle portions that the centering pin comes in contact with during displacement of the top against scratches and dampens contact noises.

To further increase the centering effect of the centering arrangement of the top according to the invention, the centering pin can have a recess at its front end into which a protrusion formed on the insert engages when in the closed position, or can have a protrusion at its front end that engages into a recess formed on the insert. Thus, the centering arrangement effects a double centering, namely by the centering recess which is entered by the centering pin on the one hand, and by the recess into which the protrusion engages on the other hand, thus clearly defining the position of the centering pin in the centering recess.

For example, the recess is a groove running in the vertical direction of the vehicle, whereas the protrusion is a corresponding rib extending in the vertical direction of the vehicle, the rib engaging into the groove in particular in a form-fitting manner.

The invention also relates to a top of a convertible vehicle that comprises a top linkage which can be displaced between a closed position, in which an interior of the vehicle is covered, and a storage position, in which the interior is uncovered and the top is stored in a storage space of the vehicle. Moreover, a roof tip is provided that is fixed to a front cowl of the vehicle when in the closed position. A centering arrangement defines the position of the roof tip in relation to the cowl when in the closed position and comprises a centering pin which engages into a centering recess of a centering seat. At a front end, the centering pin has a recess into which a protrusion disposed in the centering recess engages in the closed position. Alternatively, a protrusion is formed on the front side of the centering pin, said protrusion engaging into a recess disposed in the centering recess when in the closed position. A centering arrangement configured in this manner offers double centering, namely by the centering pin that enters the centering recess on the one hand and by the front-end recess of the centering pin or by the front-end protrusion of the centering pin which are engaged with the protrusion and with the recess of the centering recess, respectively.

The recess of the centering pin is preferably a groove into which a rib forming the protrusion in the centering recess engages.

Alternatively, it is also possible for the centering pin to have a protrusion in the form of a rib which engages into a groove at the ground of the centering recess when in in the centering position.

Further advantages and advantageous configurations of the subject-matter of the invention are apparent from the description, the drawing and the claims.

In the drawing, embodiments of a top according to the invention are illustrated in a schematically simplified manner and are explained in more detail in the following description.

BRIEF DESCRIPTIONS OF THE DRAWINGS

FIG. 5 shows a longitudinal cross-section through the centering arrangement along line V-V in FIG. 4;

FIG. 6 shows a perspective front view of an insert of the centering recess;

FIG. 7 shows a perspective rear view of the insert;

FIG. 8 shows a cross-section through the insert along line VIII-VIII in FIG. 6;

FIG. 9 shows a cross-section through an alternative embodiment of a centering arrangement corresponding to FIG. 3;

FIG. 11 shows a perspective front view of an insert of the centering arrangement according to FIGS. 9 and 10; and FIG. 12 shows a perspective rear view of the insert of FIG. 11.

DETAILED DESCRIPTION

Figure 1:
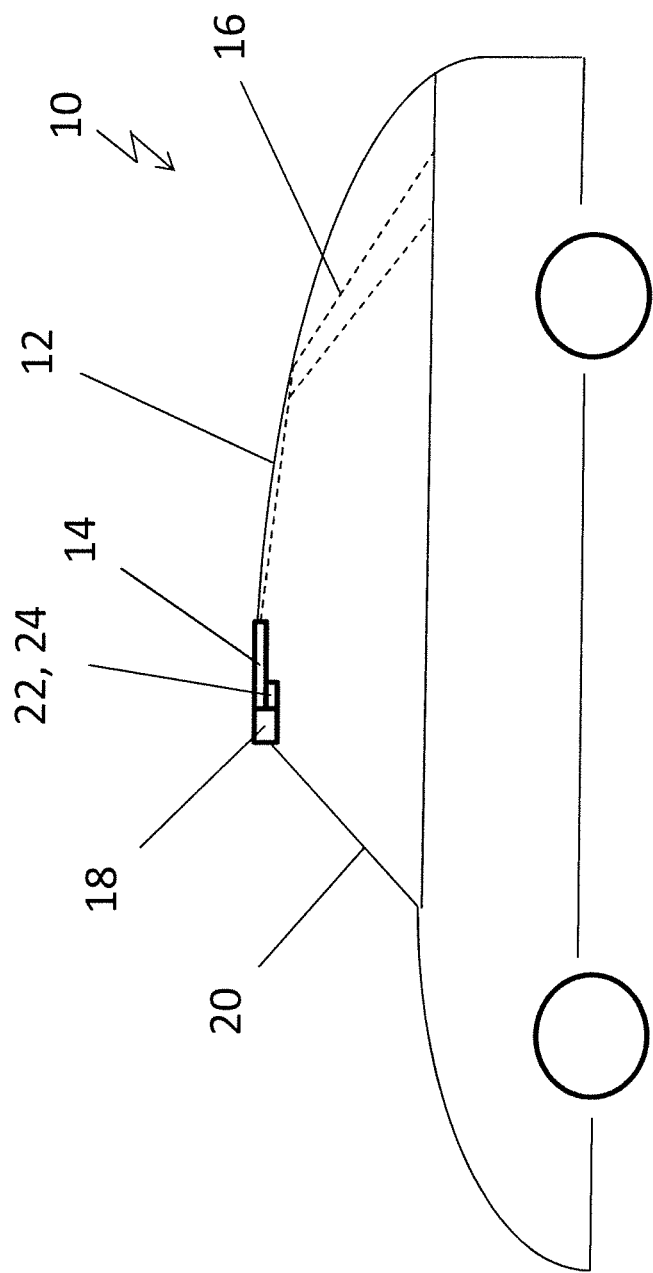
FIG. 1 shows a schematic side view of a convertible vehicle having a top according to the invention.
Figure 2:
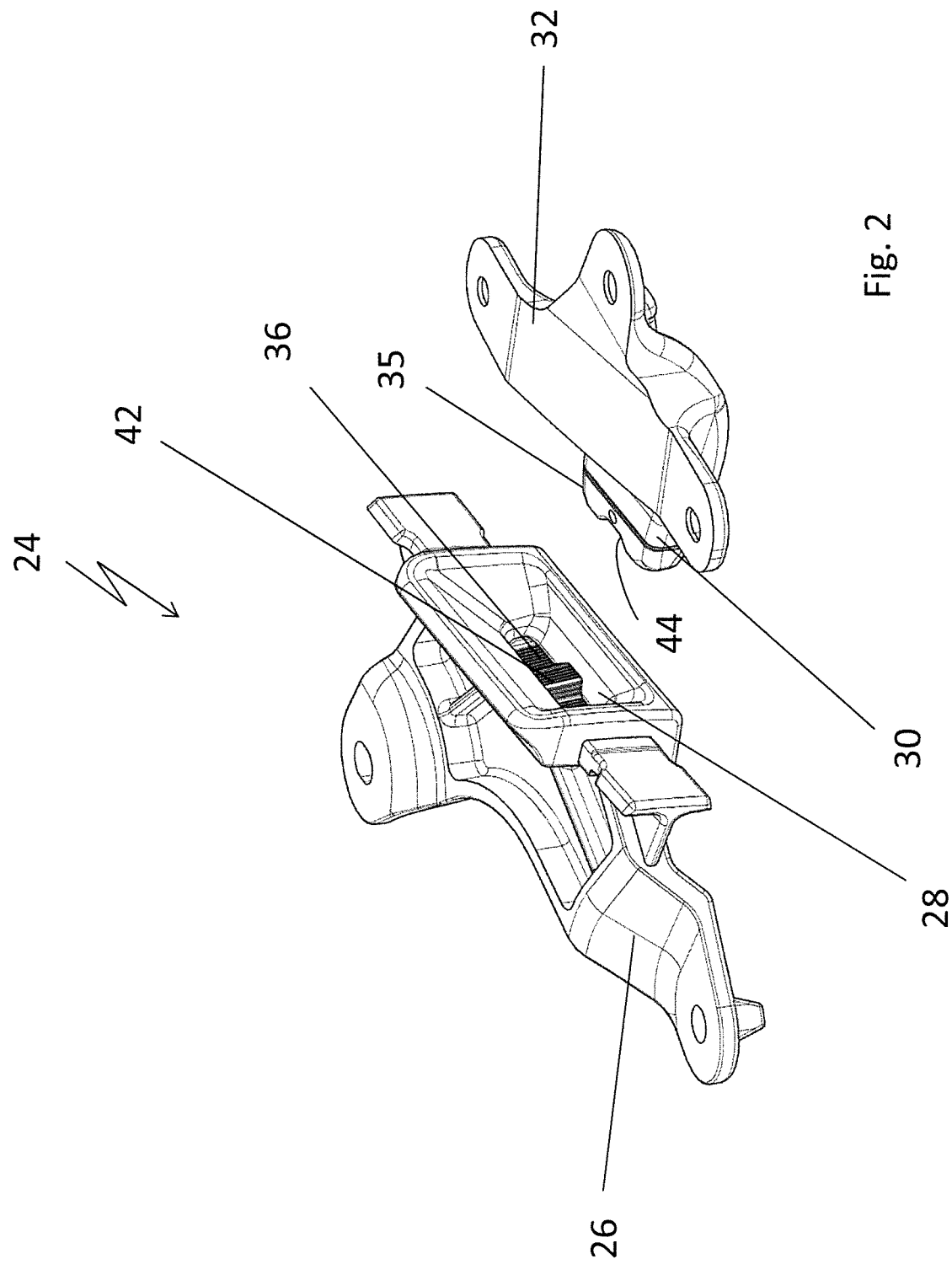
FIG. 2 shows a perspective view of a centering arrangement of the top.
Figure 3:
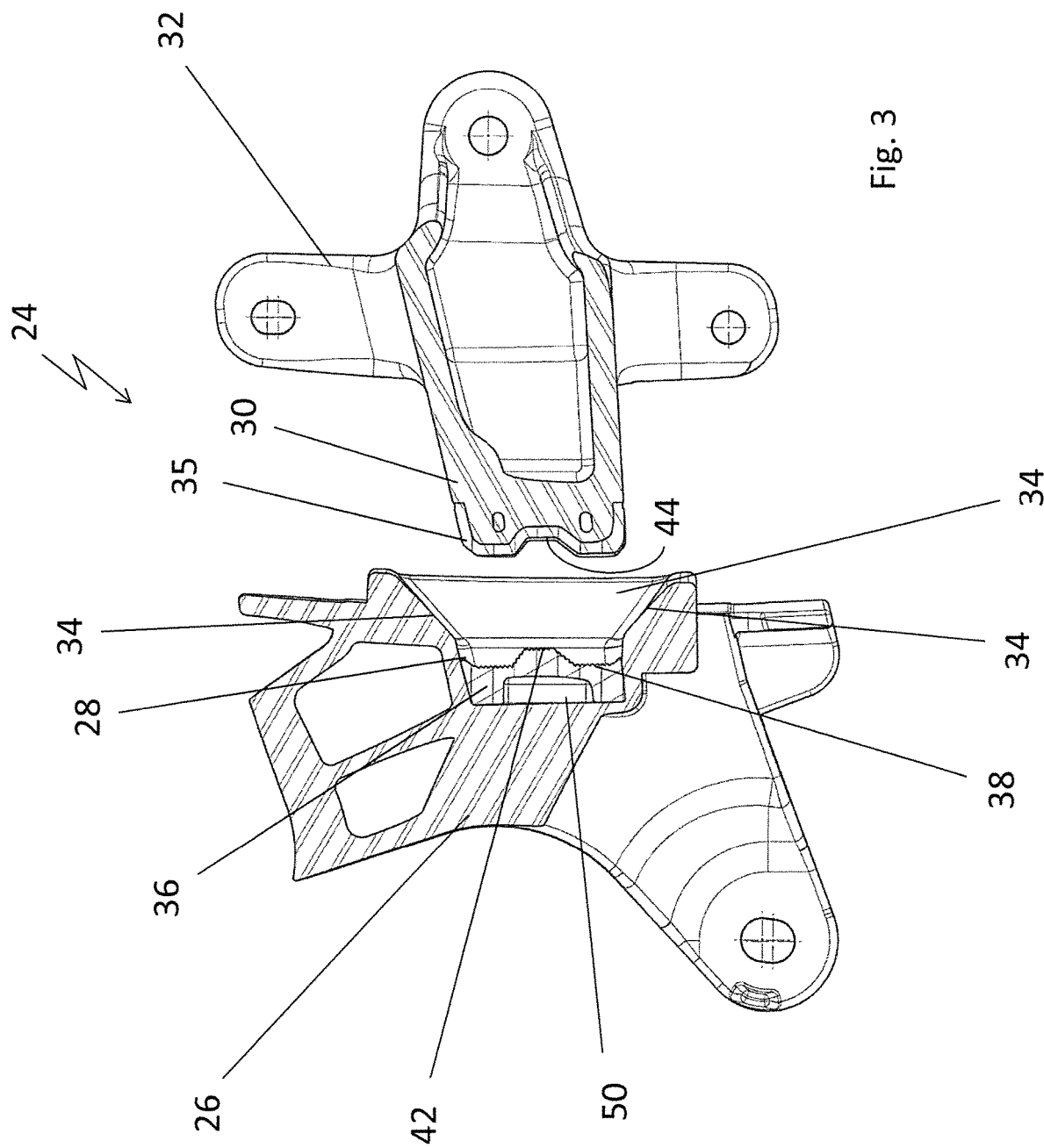
FIG. 3 shows a cross-section through the centering arrangement along a longitudinal direction of the top and a transverse direction of the top during entry of a centering pin into a centering recess.
Figure 4:
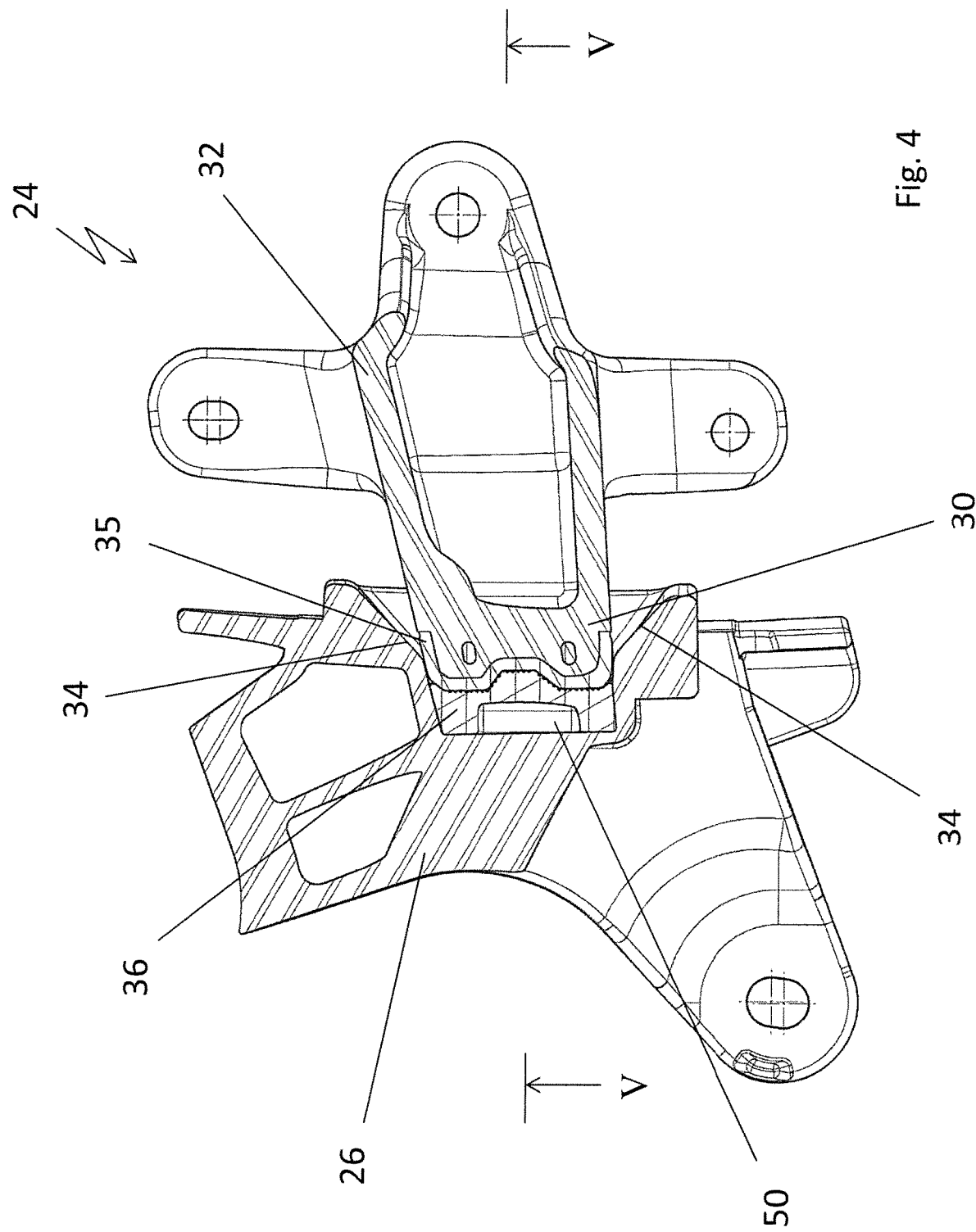
FIG. 4 shows a cross section of the centering arrangement corresponding to FIG. 3, but with the centering pin and the centering recess in the engaged position.
Figure 10:
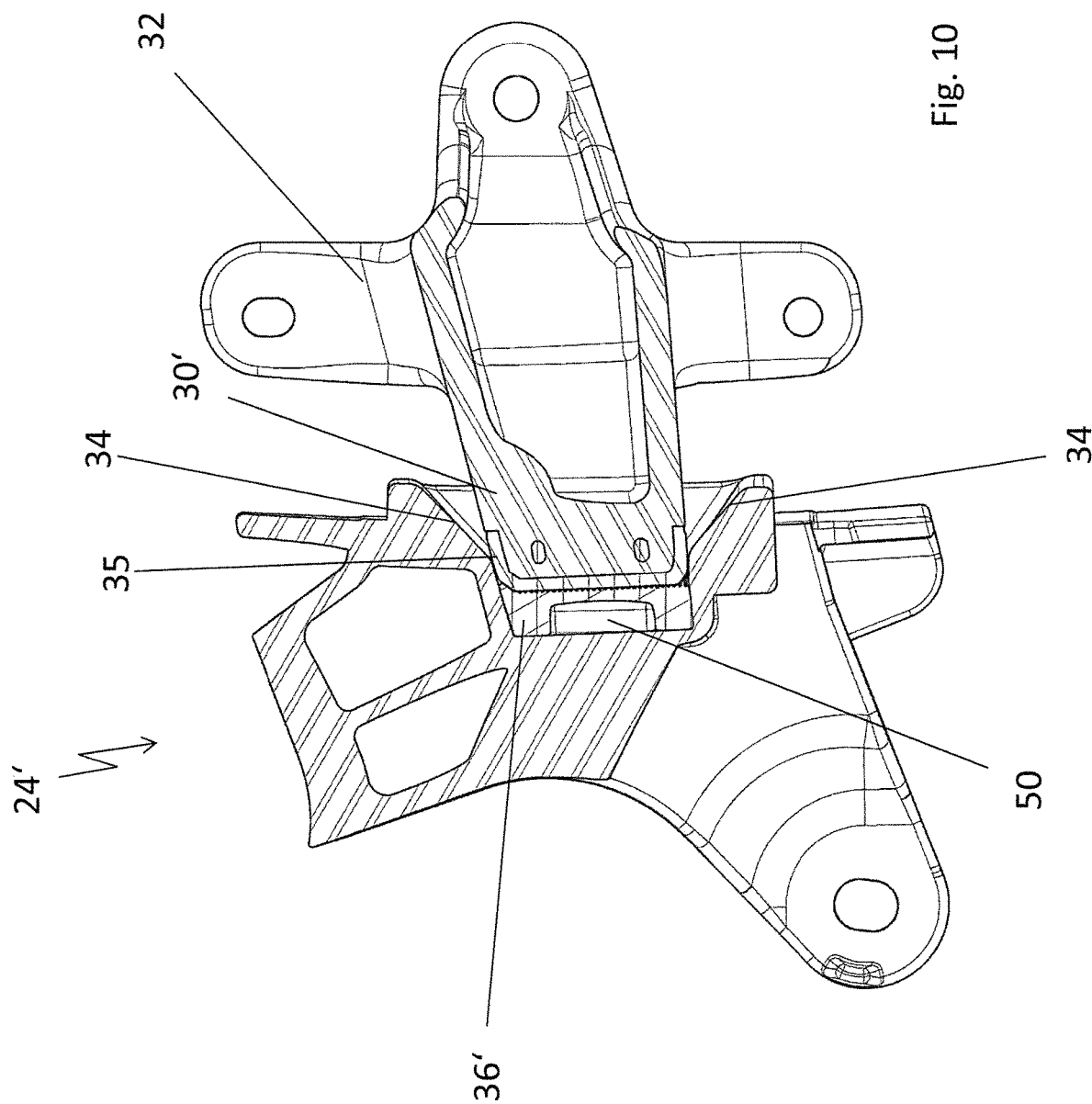
FIG. 10 shows an illustration corresponding to FIG. 9, but with a centering pin and a centering recess in the engaged position.

FIG. 1 shows a cabriolet vehicle 10 having a folding top 12 which can be displaced between a closed position, in which a vehicle interior is covered, and a storage position, in which the vehicle interior is uncovered. In the closed position illustrated in FIG. 1, a front bow, which forms a roof tip 14 of the folding top 12 and can be displaced by means of a top linkage 16, is fixed to a front cowl 18 of the vehicle 10, the front cowl 18 forming an upper frame part of a frame of a windshield 20, said upper frame part extending in the transverse direction of the vehicle.

The closed position of the folding top 12 is secured by means of a locking device 22 which is disposed on the roof tip 14 and which comprises a locking hook (not illustrated) which is engaged with a locking bolt (not illustrated) disposed on the front cowl 18.

In order to define the position if the roof tip 14 in relation to the front cowl 18 and to be able to guide it toward the front cowl 18 with accuracy of position in particular during displacement of the folding top 12 from the storage position into the closed position, the locking device 22 comprises a centering arrangement 24, which is illustrated in more detail in FIGS. 2 to 8.

The centering arrangement 24 comprises a centering seat 26 which is installed on the front cowl 18 and which has, at the side facing in the direction of the rear of the vehicle, a centering recess 28 which has an at least largely rectangular outline and which serves to be engaged by a centering pin 30 which is attached to the roof tip 14 via a brace 32.

The centering recess 28 of the centering seat 26 is surrounded by adjacent entry slopes 34 which, when the centering pin 30 is guided toward the front cowl 18, direct the centering pin 30 in the direction of the centering recess 28 in such a manner that the centering pin 30 and thus the roof tip 14 have a defined relative position in relation to the front cowl 18 with respect to the transverse direction of the vehicle and to the vertical direction of the vehicle.

To avoid scratching of the centering seat 26 and other vehicle components during the introduction of the centering pin 30 into the centering recess 28, the centering pin 30 has a plastic overmold 35 on its front end facing the centering recess 28. Otherwise, the centering pin 30 is made of metal and integral to the brace 32. Likewise, the centering seat 26, which is attached to the front cowl 18, is made of metal as well.

The centering recess 28 has an insert 36 which is made of a soft EPDM plastic material having spring-elastic properties. The insert 36 forms the ground of the centering recess 28 and has a contact side 38 which is provided with a corrugation 40, as can be seen in particular in FIGS. 6 and 8. Moreover, a rib 42 is formed on the contact side 38 of the insert 36, said rib 42 being engaged with a groove-shaped recess 44 of the centering pin 30 when the top is in the closed position so as to form a second centering (cf. FIG. 4). The corrugation 40 formed on the contact side 38 of the insert 36 extends beyond the rib 42 and is oriented in the vertical direction of the vehicle.

To keep the insert 36 in position within the centering seat 26, a retaining rib 46 is formed on either side of a longitudinal center plane of the insert 36 in the portion of the insert 36 that faces away from the contact side 38, each rib 46 having a substantially hook-shaped cross-section and engaging behind a respective retaining surface 48 of the centering seat 26, the retaining surfaces 48 being formed by cutouts in the centering seat 26.

To be able to install the insert 36 in the centering seat 26 and to be able to deform it in the area of the retaining rib 36 in order to do so, the insert 36 has a cavity 50 at the side facing away from the contact side 38, the length of said cavity 40 approximately corresponding to the length of the retaining ribs 46. Thus, when inserting the insert 36 into the centering recess 28, the material of the insert 36 can retreat into the cavity 50 in the area of the retaining ribs 46 and can spring back when the end position is reached, causing the retaining ribs to engage behind the retaining surfaces 48.

In FIGS. 9 to 12, an alternative embodiment of a centering arrangement 24' is illustrated. The centering arrangement 24' largely corresponds to the centering arrangement of FIGS. 2 to 8, but differs therefrom in that the front end of the centering pin 30' is plane, i.e. does not have a groove-shaped recess. Accordingly, in a centering recess 28 of a centering seat 26, the centering arrangement 24' also has an insert 36' that has a plane rib-free contact side 38' with which the centering pin 30', which is provided with an overmold 35, is in contact when in the engaged position.

Otherwise, the centering arrangement 24' corresponds to the centering arrangement of FIGS. 2 to 8.

REFERENCE SIGNS 10 convertible vehicle
12 folding top
14 roof tip
16 top linkage
18 cowl
20 windshield
22 locking device
24, 24' centering arrangement
26 centering seat
28 centering recess
30, 30' centering pin
32 brace
34 entry slope
35 plastic overmold
36, 36' insert
38 contact side
40 corrugation
42 rib
44 recess
46 retaining rib
48 retaining surface
50 cavity

The invention claimed is:

1. A top of a convertible vehicle, comprising: a top linkage which can be displaced between a closed position, in which an interior of the vehicle is covered, and a storage position, in which the interior is uncovered and the top is situated in a stored position, and a roof tip which is fixed to a front cowl of the vehicle in the closed position, and a centering arrangement which defines the position of the roof tip in relation to the cowl in the transverse direction of the vehicle and in the vertical direction of the vehicle in the closed position and which comprises a centering pin which engages into a centering recess of a centering seat when in a centering position, wherein an insert is disposed in the centering recess, the insert having a contact side with which a front end of the centering pin is in contact when in the centering position and which is formed by an elastic element, or wherein the centering pin has an elastic element at a centering pin front end, the elastic element being in contact with a ground of the centering recess when the centering pin is in the centering position.

2. The top according to claim 1, wherein the elastic element is made of a plastic material.

3. The top according to claim 1, wherein the contact side of the insert is corrugated.

4. The top according to claim 1, wherein the insert has at least one retaining element having a substantially hook-shaped cross-section and retaining the insert in the centering seat.

5. The top according to claim 4, wherein the retaining element is a retaining rib which is disposed on the side of the insert that faces away from the contact side.

6. The top according to claim 1, wherein the insert has a cavity on the side that faces away from the contact side.

7. The top according to claim 1, wherein the insert is made of EPDM.

8. The top according to claim 1, wherein the centering pin has a recess at a centering pin front end into which a protrusion formed on the insert engages when in the closed position, or has a protrusion that engages into a recess formed on the insert.

9. The top according to claim 8, wherein the recess is a groove running in the vertical direction of the vehicle and the protrusion is a rib extending in the vertical direction of the vehicle.

10. A top of a convertible vehicle, comprising a top linkage which can be displaced between a closed position, in which an interior of the vehicle is covered, and a storage position, in which the interior is uncovered and the top is stored in a storage space of the vehicle, and a roof tip, which is fixed to a front cowl of the vehicle in the closed position, and a centering arrangement, which defines the position the roof tip in relation to the cowl in the closed position and which comprises a centering pin which engages into a centering recess of a centering seat, wherein the centering pin has a recess at its front end into which a protrusion disposed in the centering recess engages when in the closed position, or wherein the centering pin has a protrusion at a centering pin front end which engages into a recess formed in the centering recess.

11. The top according to claim 10, wherein the recess is a groove and the protrusion is a rib.

\* \* \* \* \*